United States Patent [19]

Wilkinson

[11] 4,424,688

[45] Jan. 10, 1984

[54] POWER UNIT FOR ABSORPTION HEAT EXCHANGE SYSTEM

[75] Inventor: William H. Wilkinson, Upper Arlington, Ohio

[73] Assignee: Battelle Memorial Institute, Columbus, Ohio

[21] Appl. No.: 397,620

[22] Filed: Jul. 12, 1982

[51] Int. Cl.³ .......................................... F25B 15/00
[52] U.S. Cl. ...................................... 62/476; 62/497
[58] Field of Search ................................. 62/476, 497

[56] References Cited

U.S. PATENT DOCUMENTS

| | | | |
|---|---|---|---|
| 3,323,323 | 6/1967 | Phillips | 62/476 X |
| 3,367,137 | 2/1968 | Whitlow | 62/497 |
| 3,608,331 | 9/1971 | Leonard, Jr. | 62/476 |
| 4,106,309 | 8/1978 | Phillips | 62/497 X |
| 4,127,993 | 12/1978 | Phillips | 62/497 X |

Primary Examiner—Lloyd L. King
Attorney, Agent, or Firm—Robert B. Watkins; Philip M. Dunson

[57] ABSTRACT

A power unit combining a generator and a condenser for an adsorption heat exchange system including apparatus comprising a plurality of coaxially substantially vertical chambers in which desorption and condensation take place simultaneously in opposite walls of the chamber. Means may be provided to convey the refrigerant solution pair from one chamber to the next.

12 Claims, 3 Drawing Figures

POWER UNIT FOR ABSORPTION HEAT EXCHANGE SYSTEM

SUMMARY OF THE INVENTION

This invention relates to a power unit combining a generator and a condenser for an absorption heat exchange system. More particularly, it is an apparatus for use with either an absorption heat pump system or an absorption refrigeration system.

The apparatus comprises a plurality of coaxially positioned pipes surrounding a vertically oriented central pipe. Each pipe is sufficiently larger, progressive from the center axis, to form annular chambers that are contiguous one to the next surrounding the center pipe. The chambers are closed at the upper and lower ends by members that are connected to the central pipe and the plurality of surrounding pipes. A source of heat is placed to provide heat into the interior of the center pipe. A means is provided to bring a cooling fluid into contact with the outer surface of the pipe of largest diameter. Also a means is provided for discharging a refrigerant-absorbant solution upon the inner walls of the annular chambers to desorb the refrigerant from the absorbant on the inner walls of the chambers and to condense refrigerant on the outer walls of the chambers. The refrigerant-absorbant solution and the refrigerant are separately collected at the bottom of the chambers for circulation to appropriate components of an absorption heat exchange system.

In absorption refrigeration systems, which operate primarily through heat exchange between various concentrations of chemical solutions, the rate of heat transfer and the effectiveness of heat transfer are very important. Configurational changes in the apparatus through which the refrigeration chemicals are transferred have an important bearing on the rate and effectiveness of heat transfer in the system.

Traditionally, in an absorption refrigeration system the generator comprises a reservoir in which the refrigerant solution pair is subjected to heat, either by the passage of heat through tubes or by the application of heat to the bottom and sides of the reservoir container. U.S. Pat. No. 3,495,420-Loweth et al., shows a typical unit for an absorption system.

Also, as shown in the above patent, a condenser of reservoir-like configuration is in adjacent spaced position. Refrigerant vaporizes in the generator chamber and is transferred over to the condenser chamber. In this conventional system the heat applied at the generator is wasted to a great extent or ineffectively applied to a large portion of the solution in the reservoir. In the same fashion the cooling applied at the condenser is not effectively used.

In the description of this invention, it is important that a clear distinction be made between solutions entering and leaving the power unit. Therefore, adopted herein is the notation of the standard setting body on absorption systems in the U.S., the ASHRAE Technical Committee (8.3) on Absorption Machines. Their notation is given in the following quote from the ASHRAE 1979 Equipment Handbook, Chapter 14:

"To avoid confusion of terminology in the absorption field, ASHRAE Technical Committee 8.3 recommends the following standardized terms for the absorbent-refrigerant solution. Weak absorbent is that solution which has picked up refrigerant in the absorber and is then weak in its affinity for refrigerant. Strong absorbent is that solution which has had refrigerant driven from it in the generator and, therefore, has a strong affinity for refrigerant."

In co-pending application, Ser. No. 177,695, filed Aug. 31, 1980, assigned to Battelle Development Corporation, a subsidary of Battelle Memorial Institute the assignee of this patent application, improvements have been disclosed that are directed to the configurational attributes of heat exchangers in absorption systems. The disclosures therein, and in any continuation or continuations-in-part thereof, are made a part of this specification by reference.

The invention herein is a further improvement in the heat exchange units of absorption systems. In this invention the generator(s) and condenser(s) are combined in a single-or multiple-stage unit which is termed herein a "power unit". This power unit is so termed in reference to the fact that it combines the two types of components of the refrigeration system which are on the high pressure side of the system where the high temperature (driving) energy is applied. The other portions of the system, including the evaporator and the absorber, operate at a relatively lower pressure.

It is an object of this invention to provide a configuration of apparatus and structure such that the generator and condenser are combined, with operative portions of one forming other operative portions of the other, and with one integrated with the other so that the heat transfer of one is integrated with the heat transfer of the other. Another object is to provide a plurality of stages in a power unit to provide an optimum heat transfer efficiency with a minimum of space and cost, through simplicity of the arrangement and construction.

Other features and objects of the invention will be apparent from the following drawings and description, as well as the appended claims.

DETAILED DESCRIPTION OF THE INVENTION

Figure 1:
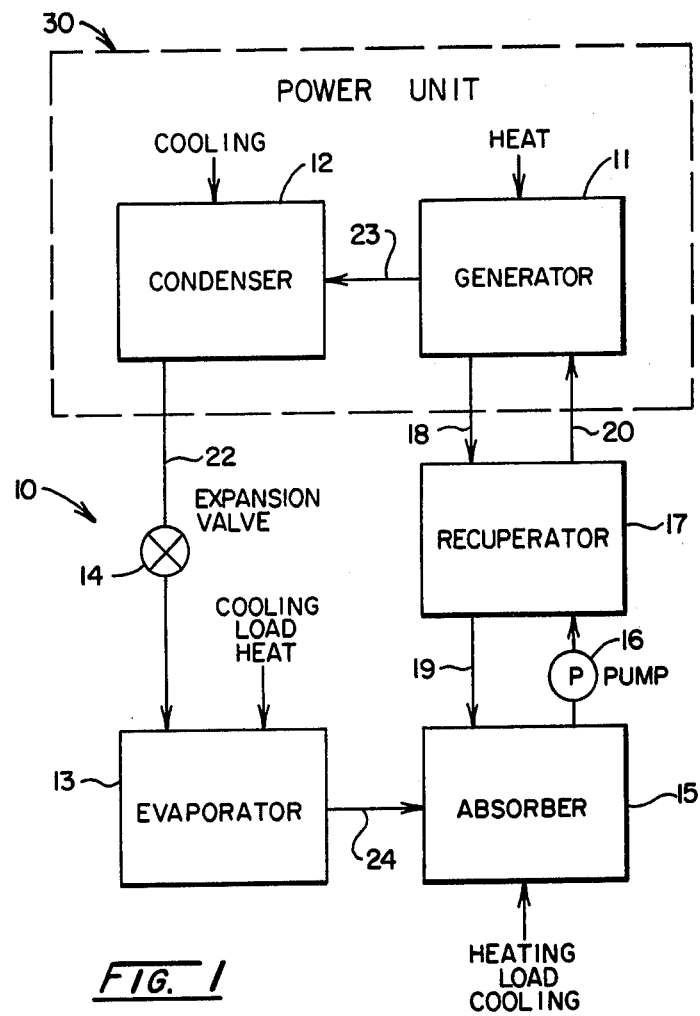
FIG. 1 is a schematic view of a typical prior art conventional absorption refrigeration system in which the invention is practiced.

Referring to FIG. 1, a conventional absorption refrigeration/heating system 10 is shown schematically including a generator 11, a condenser 12, evaporator 13, expansion valve 14, absorber 15, pump 16, and recuperator 17. The power unit of this invention carries out and combines the functions of the generator 11 and condenser 12 of the conventional system 10. The dash lines encompass that portion of the system 10 that is combined in the power unit 30.

The operation of conventional absorption heating-/cooling systems is well known and requires little further explanation. In a typical system, water is a refrigerant dissolved in a lithium bromide-water solution, often called the "solution pair". Water is absorbed in the lithium bromide solution to varying degrees throughout the system and the heat of absorption is added or extracted to produce heating and cooling effects.

The solution pair enters the generator through the conduit 20 where it is subjected to heat. The applied heat builds up the pressure and desorbs refrigerant water in the form of vapor which is conveyed through line 23 to the condenser 12. There, external ambient cooling condenses the water vapor to liquid, which is conveyed through the line 22 and through the expansion valve 14, where heat is absorbed in the evaporator 13. In a refrigeration system the heat absorbed in the evaporator 13 is from the cooling load. The low pressure vapor passes through line 24 to the absorber 15 where ambient cooling allows the lithium bromide solution to absorb the water vapor. The solution pair is then conveyed to the recuperator 17 by the pump 16. The recuperator is a counterflow heat exchanger where heat from the absorbent lithium bromide coming from the generator 11 through line 18 heats the solution pair on its way to the absorber 15 through line 19.

In the heating cycle the cooling applied at the absorber 15 and/or the condenser 12 is the heating load.

Figure 2:
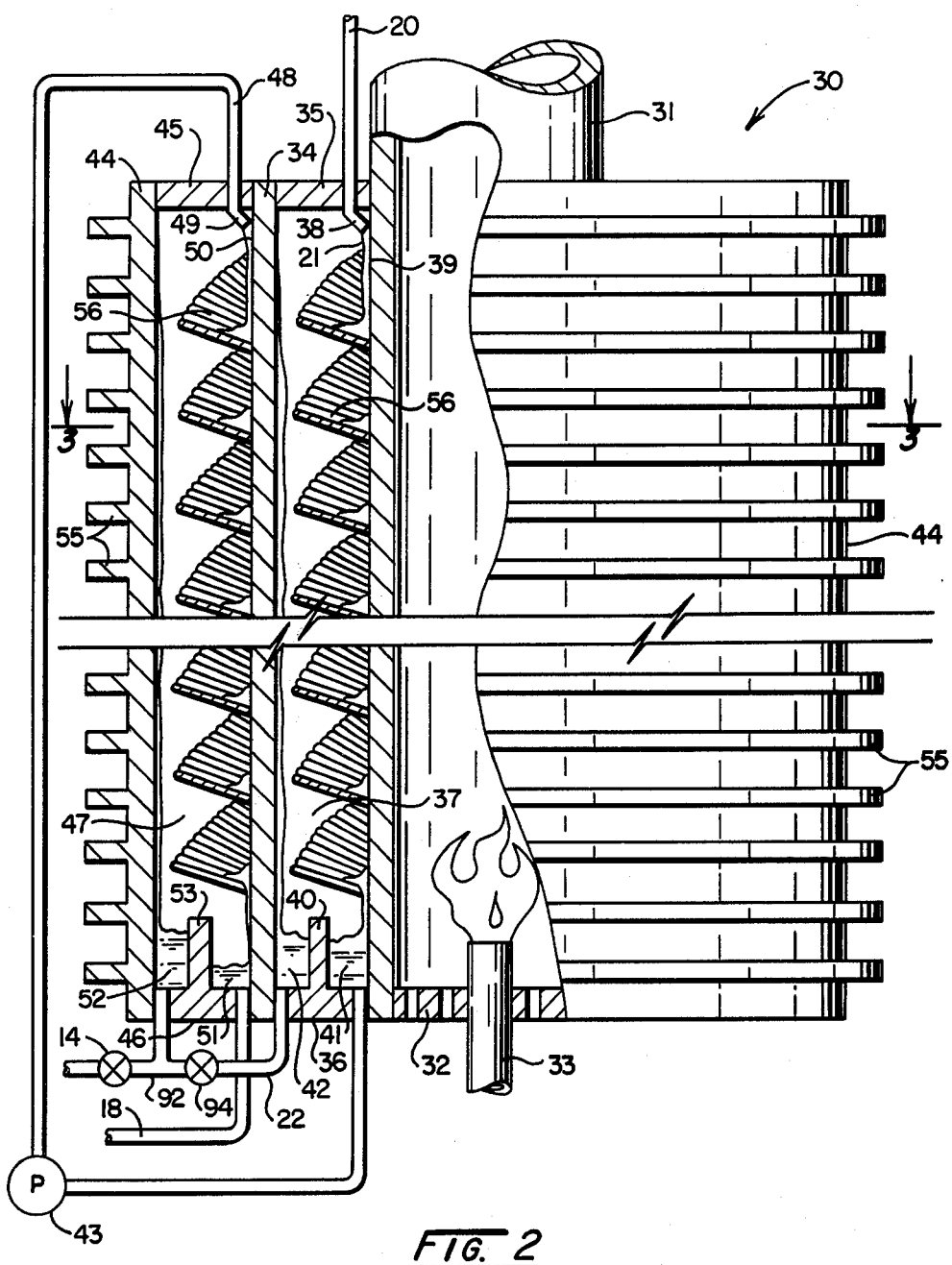
FIG. 2 is a partial sectional elevation view of the apparatus of this invention.

Referring to FIG. 2, the fire-tube absorption power unit of this invention comprises a vertically oriented "combustion chamber" center columnar pipe member 31 having at its lower end a base plate 32 with a coaxial aperture through which a source of heat 33, typically a pulse combustor, protrudes. Coaxially surrounding the center columnar pipe member 31 is a second columnar pipe member 34 connected to the outer surface of the center columnar pipe member 31 by an upper end outwardly extending, radially positioned, closure plate 35 and similar lower end closure plate 36, thereby creating a first annular desorber chamber 37.

The various parts comprising this invention are substantially coaxially arranged, and parts termed "inner" are closer in proximity to the central axis.

The washer-like upper end closure plate 35 has an aperture for the passage of a refrigerant-absorbant solution 21 through conduit 20 from the recuperator 17. A bend 38 or other means in the end of conduit 20 causes the refrigerant-absorbant 21 to be dispersed onto the outer surface 39 of the center columnar pipe member 31. The lower end closure plate 36 is provided with a partition 40 which separates the bottom of annular chamber 37 into an inner reservoir 41 and an outer reservoir 42.

A third columnar pipe member 44, is attached substantially coaxially surrounding the second columnar pipe member 34, by another upper end outwardly extending, radially positioned closure plate 45 and similar lower end closure plate 46, creating a second annular desorber chamber 47. The upper end closure plate 45 has an aperture through which passes a conduit 48 that connects chamber 47 with the inner reservoir 41 of chamber 37. Chamber pressure differences, in some cases enhanced by a pump 43, raise the partially strengthened refrigerant-absorbant solution in conduit 48. A bend 49 or other means in the upper end of conduit 48 inside chamber 47 causes the partially strengthened refrigerant-absorbent solution from inner reservoir 41 to be dispersed into the outer surface 50 of the second pipe member 34.

The lower end closure plate 46 of chamber 47 is likewise divided into an inner annular reservoir 51 and outer annular reservoir 52 by a partition 53. The conduit 18 connects inner reservoir 51 with the recuperator 17. Outer reservoir 42 of chamber 37 and outer reservoir 52 of chamber 47 are interconnected by pressure let down means 94 and conduit 22, and then are connected to expansion valve 14 by the conduit 92.

The outside surface of the third columnar pipe member 44 may be provided with a plurality of radial surface extending members such as fins 55.

Attached to the surface 39 of the central columnar pipe member 31 within chamber 37 are generally radially positioned, outwardly and upwardly projecting, surface extending members that may have slits essentially forming spines 56. Likewise, within chamber 47 on the surface 50 of the second columnar pipe member are generally radially positioned outwardly and upwardly projecting surface extending members or spines 56.

In the preferred embodiment shown, these surfaces extending members 56 are attached near the top of chambers 37 and 47 and are wrapped spirally around the central and second columnar pipe members, respectively, in helical progression down to close proximity of the partitions 40, 53. In another construction the fins could be shaved from the pipe wall itself.

In a typical practice of this invention, the flame of a pulse combustor burns in the interior of or below the central pipe member 31, heating the pipe to a high temperature. When refrigerant/absorbant solution 21 from the recuperator 17 is introduced through conduit 20 into chamber 37 and onto surface 39, the water component of the solution 21 is desorbed and separates, becoming a vapor which then condenses on the lower temperature surface of the second pipe member 34. The surface extending members 56 serve to expand the heated surface area promoting exceptionally effective vaporization of the water-refrigerant from a thin film condition.

The solution 21 becomes weaker in refrigerant as it progresses downward along the surface 39 and the spines 56 until it collects in the reservoir 41. The strengthened solution is pumped through the conduit 48, through the inlet 49, onto the surface 50 where it flows downward and over additional spines 56. Desorption takes place and water vapor is driven off leaving the now further strengthened collection of solution in the reservoir 51. The new strong solution of water and lithium bromide is conveyed through conduit 18, through the recuperator 17, and line 19, to the absorber 15.

During the desorption processes that are taking place in chambers 37 and 47, as just previously described, condensation simultaneously takes place on the inner walls of the second pipe 34 and of the third page 44 since these walls are cooler than the opposite walls and spines where desorption is taking place. The source of cooling effect is the outer wall of the third page 44 with the surface extending fins 55. Ambient air, or in some circumstances a liquid coolant (such as water) in a jacket (not shown), is passed adjacent to and in contact with the fins 55 and the wall, extracting heat progressively outwardly from the center of the power unit 30.

As condensation takes place, the water flows down the outer walls of chambers 37 and 47 and collects in the outer reservoirs 42 and 52, respectively, from whence it is carried via the conduits 22 and 92 to the expansion valve 14.

EXAMPLE

In a typical illustrative power unit which coulfd be constructed and operated in an absorption heat exchange system to provide three-quarter ton refrigeration capacity, features would be as follows:

Center pipe—$\frac{3}{4}''$ Schedule 40 (0.675" OD–0.493 ID)

Second pipe—1¼" Schedule 40 (1.66" OD-1.38" ID)
Third pipe—2½" Tube/14 gauge (2.5" OD-2.334" ID)
Length of Pipes between enclosure members—5.5' (1.7 M).

Into this power unit 30 a lithium bromide/water weak solution pair having a concentration of 58½% lithium bromide is introduced to the outer surface 39 of the center pipe 31 at a temperature of about 312° F. This weak solution flowing down over the surface extending members 56 exits from the chamber 37 through the reservoir 41 at the bottom, partially strengthened to a concentration of 60½% lithium bromide at a temperature of about 332° F. Water condensate gathers on the inner wall of the second pipe 34 and exits from the chamber 37 through the reservoir 42 at the bottom via the conduit 22 at a temperature of about 226° F. The partially strengthened lithium bromide solution is carried via the conduit 46 to the outer wall 50 of the second pipe 34 at a temperature of about 194° F. (the concentration remaining at 60½% lithium bromide) after passing through the recuperator 17. After coursing down over the surface extending members 56, the strong solution exits from the chamber 47 through the reservoir 51 via the conduit 18 at the bottom at a temperature of about 202° F. and a concentration of 62.1% lithium bromide. At this point, it is a strong solution fully desorbed. Condensate collects on the inner wall of the third page 44 at a temperature of about 110° F. and exits from the chamber 47 through the reservoir 52 at the bottom via the conduit 92. Cooling water is circulated around the outside of the third page 44 including the cooling fins 55 at a temperature of about 85° F.

Figure 3:
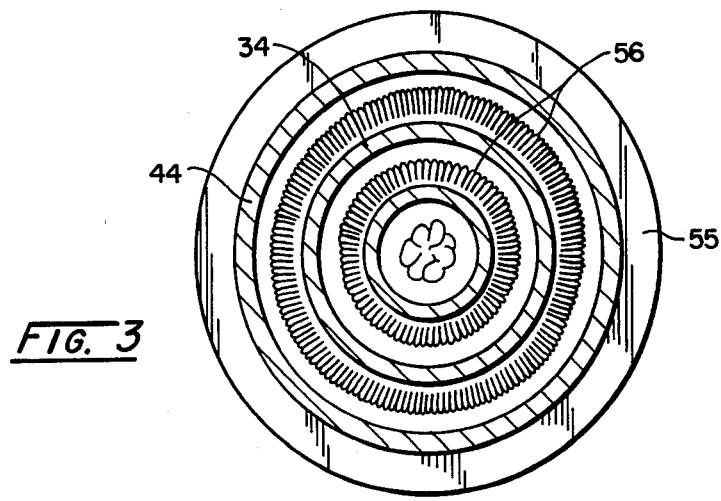
FIG. 3 is a sectional plan view taken in the plane 3—3 of FIG. 2.

The concentration of the solution leaving the chamber 47 has increased from 58½% lithium bromide to 62.1% lithium bromide in the two-stage unit shown in FIGS. 2 and 3. This is considered exceptionally good in an absorption unit of this size and capacity.

It will be seen that the enclosed coaxial configuration of the power unit of this invention is especially efficient and effective in the conservation of space and energy. The heat is generated in a confined space where its only possible progression is outward into the structure where it is used to advantage (other than the exhaust through the top which is a loss in all combustion systems). Conversely the maximum areas for cooling effect is obtained through the encirclement of the unit of the outer pipe 44 and the fins 55.

The apparatus of this invention is shown with the central axis of the various primary pipes, chambers, and chamber walls in the vertical position. It is believed that the apparatus and system will operate most effectively in this substantially vertical position. However, it is to be understood that the system may operate in varying lesser degrees of proficiency as the central axis is inclined to the vertical. At some position of inclination, disparity between desorption and condensation on the lower side, and the desorption and condensation on the upper side will so reduce these effects as to reduce operative effectiveness of the apparatus. Determination of such inclination would be a matter of routine experimentation by those skilled in the art, and it is intended that this invention shall encompass and apply to apparatus systems that are inclined to the vertical to the degree that is acceptable to the user.

The configuration using columnar pipes and annular chambers is simple in construction and easily manufactured from commonly available and manufactured materials such as steel pipe with welded joints. The spiral spinned surface extenders 56 are particularly effective in utilization of the space in the annular chambers 37 and 47.

Because of the unique coaxial configuration with the surface extender, the vapor transport distance between evaporation surfaces on the extenders and the condensation surface on the outer walls of the chambers is uniformly very short. This increases the thermal efficiency of apparatus of this type.

Because of the configuration, exceptionally high heat input typically can be provided in the form of pulse combustors 33. By this means surprisingly high temperatures may be generated at the center of the power unit which can be effectively handled by the cooling periphery.

Also because of the configuration and its heat transfer effectiveness, problems of hot spots are avoided or minimized. In devices of this kind, it is not uncommon for boiling to take place in the desorption process when high heat transfer rates are attempted. When boiling takes place with lithium bromide, and other typical solutions, agitation and temperature differences occur across the heat exchange surface. These "hot spots" curtail the overall effectiveness are well as producing highly corrosive atmospheres which are detrimental to the materials from which the heat exchangers are made. Also the hot spots can lead to solution crystalization which blocks the passages and stops the operation of the device.

In the apparatus of this invention hot spots are avoided since the point of highest heat is approached progressively by the solution pair as it progresses down the spined wall of the inner surfaces of the chambers.

It will be seen that the apparatus of this invention combines generators and condensers of a multi-stage absorption refrigeration system into one "power unit" in which each heat transfer wall serves as a very effective component of the other.

A typical preferred embodiment of the invention shown and described herein is a two-stage unit. Using the concepts of this invention, additional stages can be coaxially added between the inner pipe 31 and the outer pipe 44. Each additional stage provides an opportunity to further increase the effectiveness of the system by increasing the separation between the solution and the refrigerant in the high pressure side of the system.

Although a preferred embodiment of the invention has been herein described, it will be understood that various changes and modifications in the illustrated and described structure can be effected without departing from the basic principles that underly the invention. Changes and modifications of this type are therefore deemed to be circumscribed by the spirit and scope of the invention, except as the same may be necessarily modified by the appended claims or reasonable equivalents thereof.

What is claimed is:
1. A power unit for an absorption heat exchange system comprising a plurality of substantially coxially positioned pipes of progressively larger diameters and of sizes that provide a space between the inner and outer walls of the adjacent pipes and including:
   a. a hollow vertically oriented central pipe;
   b. an upper and a lower closure member extending outwardly from the center pipe and connected to the outer pipes to form substantially annular cham- bers, contigous one to the next, surrounding the center pipe;

c. means to provide heat in the central pipe;

d. means for providing a cooling fluid to contact the outer surface of the largest diameter pipe;

e. means for discharging a refrigerant-absorbent solution upon the inner walls of the substantially annular chambers to desorb refrigerant from solution with the absorbant and to condense the refrigerant on the outer walls of the chambers;

f. means for collecting the refrigerant and solution separately in the substantially annular chambers;

g. means for conveying the separately collected solution from one chamber to the next contiguous progressively larger chamber and away from the largest chamber; and h. means for conveying the separately located refrigerant from the chambers.

2. A power unit according to claim 1 in wherein the closure members are flanges substantially radially positioned with respect to the longitudinal axis of the unit.

3. A power unit according to claim 1 wherein the pipes are circular in cross-sectional shape.

4. A power unit according to claim 1 wherein the inner pipes have generally radially positioned outwardly and upwardly projecting surface extending members at spaced intervals between the end closure members along the outer surface.

5. A power unit according to claim 4 wherein the surface extending members have slits, essentially forming spines.

6. A power unit according to claim 5 wherein the surface extending members are positioned and attached to the outer surface of the pipes in a spiral or helical progression between the end closure members.

7. A power unit according to claim 4 wherein the effect of the cooling fluid is enhanced by the provision of surface extending members on the outer side of the outside pipe.

8. A power unit according to claim 4 wherein the means for applying a cooling fluid and effect is a water jacket.

9. A power unit for an absorption heat exchange system of generally symmetric construction about a central axis for an absorption refrigeration system, comprising:

a. a centrally positioned combustion chamber member constructed with an outer wall surface and an inner wall surface, and formed to receive a fuel-fired combustor positioned to extend a flow of combustion products into a combustion chamber therein, the combustion chamber member having generally radially positioned outwardly projecting surface extending surfaces at spaced intervals, between opposite ends along the outer wall surface, in the direction of the central axis, the ends comprising radially formed closure members outwardly projecting from the outer wall surface;

b. a first desorber chamber member surrounding the combustion chamber member, spaced apart from the outer wall thereof and attached to the closure members, the first desorber chamber member having generally radially positioned outwardly projecting surface extending surfaces at spaced intervals between the opposite ends along the outer wall in the direction of the central axis, the ends comprising radially formed closure members outwardly projecting from the outer wall surface;

c. a first desorber chamber, between the combustion chamber member and the first desorber chamber member, having an inlet aperture at one end and having a partition at the opposite end, the partition being positioned generally parallel to the outer wall and perpendicular to the closure member, dividing the end of the first desorber chamber into inner and outer reservoirs, with an outlet aperture from each reservoir;

d. a second desorber chamber member surrounding the first desorber chamber member, spaced apart from the outer wall thereof and attached to the closure members; and e. a second desorber chamber between the first desorber chamber member and the second desorber chamber member having an inlet aperture at one end and having a partition at the opposite end, the partition being positioned generally parallel to the outer wall and perpendicular to the closure member, dividing the end of the second desorber chamber into inner and outer reservoirs, with an outlet aperture from each reservoir.

10. A power unit according to claim 9 wherein there is a fluid communication means between the inner reservoir of the first desorber chamber and the inlet to the second desorber chamber.

11. A power unit according to claim 9 wherein the surface extending surfaces have slits, essentially forming spines.

12. A power unit according to claim 11 wherein the surface extending surfaces are positioned and attached to the outer surface in a helical progression between the end closure members.

* * * * *